June 4, 1946. E. D. WILKERSON 2,401,715
VEHICLE WHEEL ALIGNMENT TESTING APPARATUS AND METHOD
OF TESTING VEHICLE WHEEL ALIGNMENT
Filed Feb. 26, 1943 3 Sheets-Sheet 1
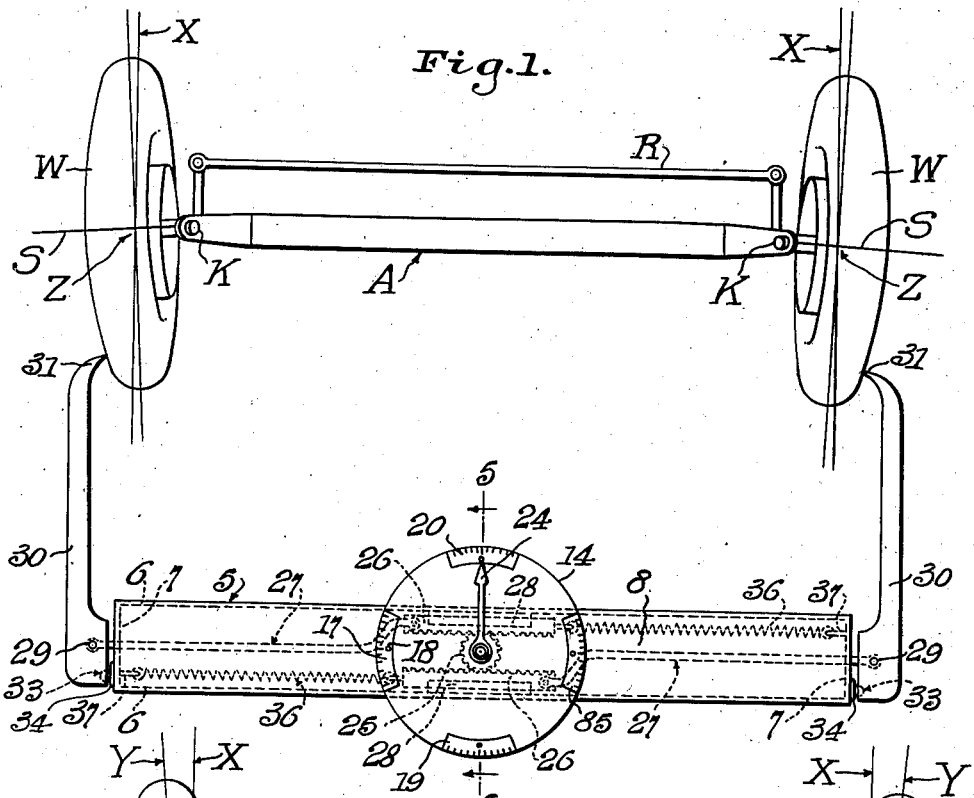
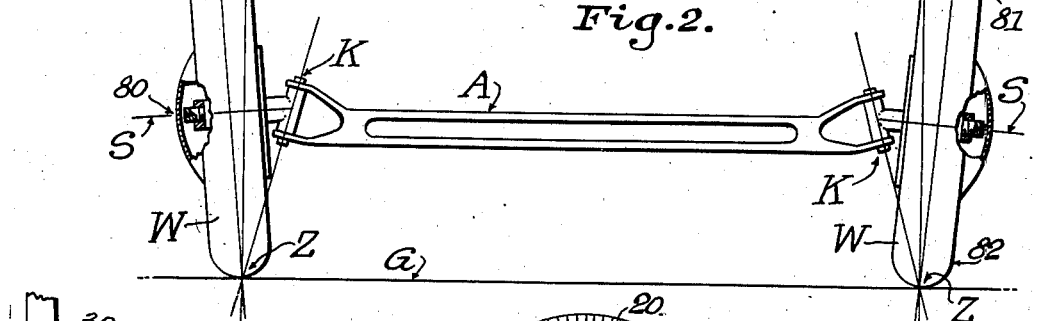
Inventor
Edward D. Wilkerson
By Mason, Porter & Diller
Attorneys June 4, 1946.　　　　　E. D. WILKERSON　　　　　2,401,715
VEHICLE WHEEL ALIGNMENT TESTING APPARATUS AND METHOD
OF TESTING VEHICLE WHEEL ALIGNMENT
Filed Feb. 26, 1943　　　　　3 Sheets-Sheet 2
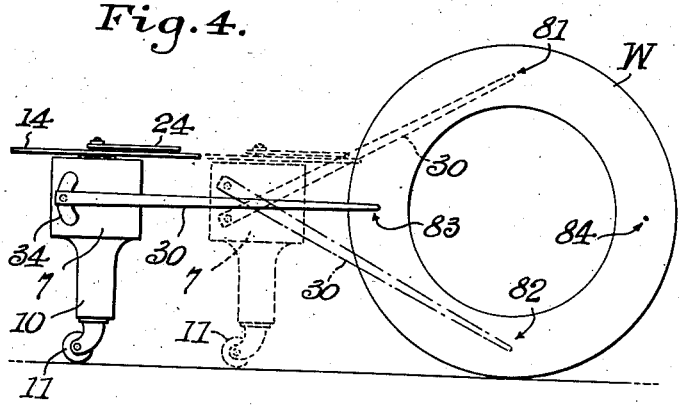
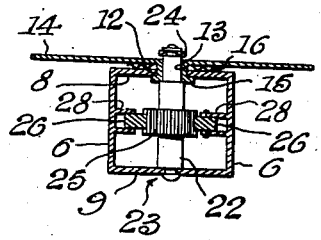
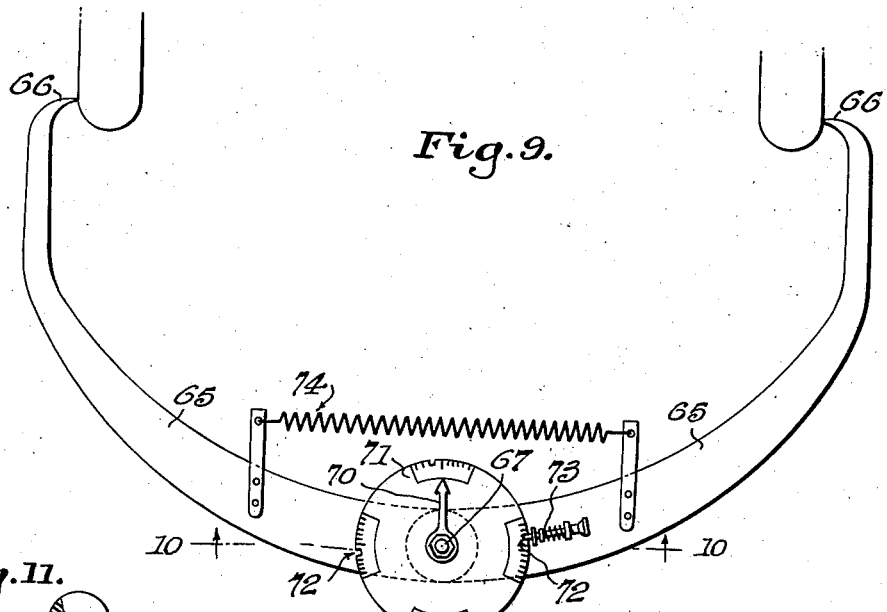
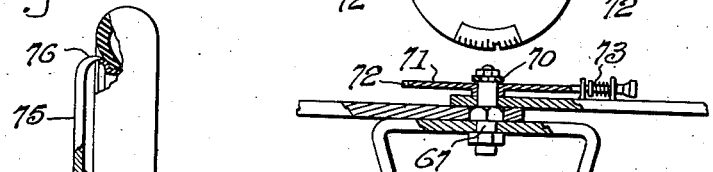
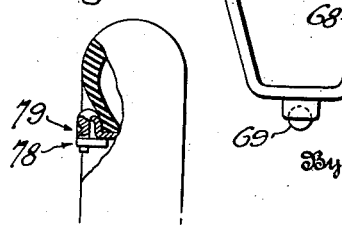
Inventor
Edward D. Wilkerson
By Mason, Porter & Diller
Attorneys June 4, 1946.                E. D. WILKERSON                    2,401,715
        VEHICLE WHEEL ALIGNMENT TESTING APPARATUS AND METHOD
                 OF TESTING VEHICLE WHEEL ALIGNMENT
                     Filed Feb. 26, 1943           3 Sheets-Sheet 3
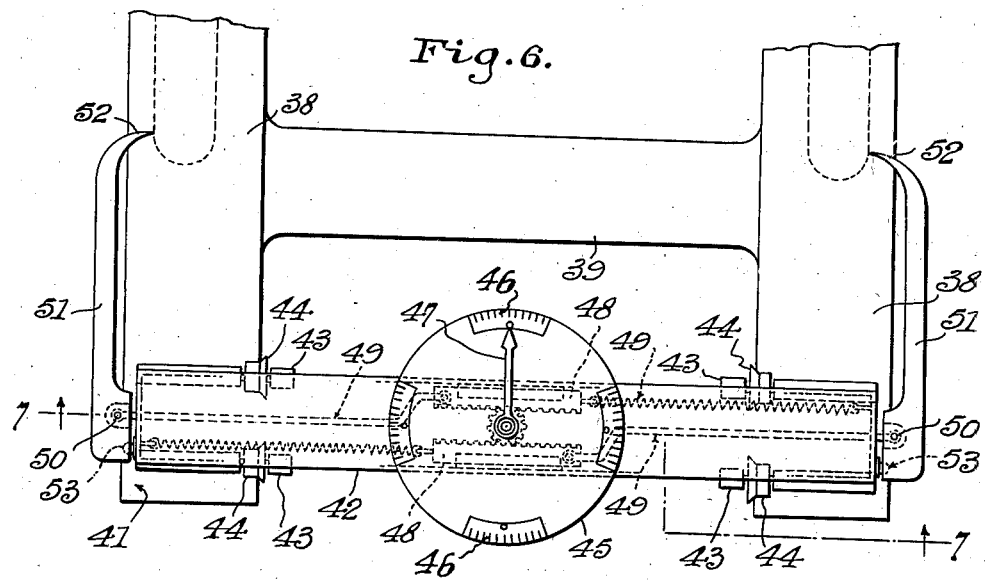
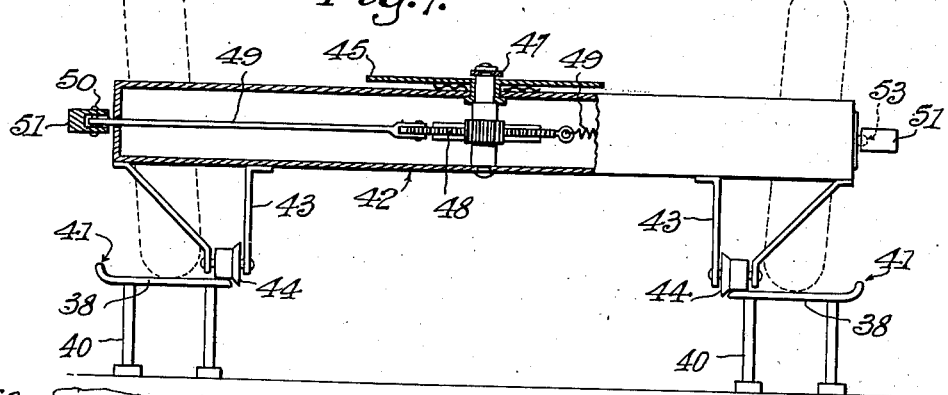
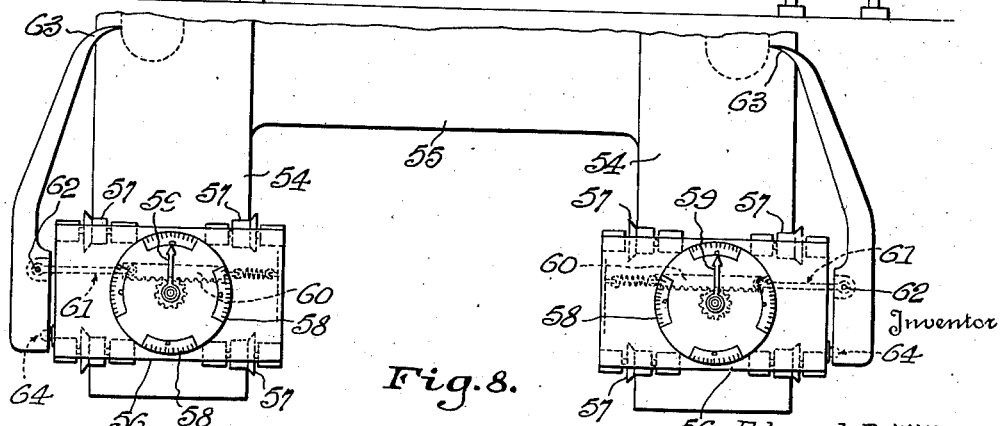
Edward D. Wilkerson, Inventor Patented June 4, 1946

2,401,715

UNITED STATES PATENT OFFICE 2,401,715

VEHICLE WHEEL ALIGNMENT TESTING APPARATUS AND METHOD OF TESTING VEHICLE WHEEL ALIGNMENT

Edward David Wilkerson, Orange, N. J.

Application February 26, 1943, Serial No. 477,272

23 Claims. (Cl. 33—203)

The invention relates generally to means for testing the alignment of vehicle wheels and primarily seeks to provide a novel, simply and inexpensively constructed apparatus which may be employed efficiently and with great facility in the testing of vehicle wheel alignment, and more particularly in testing the caster, camber and toe-in of the wheels.

It is well known that the wheels of modern day automobiles are positioned in accordance with certain standards determined by the respective manufacturers as adapted for the most efficient road performance. These standards include camber, caster, king pin inclination and toe-in. All of these factors are important and so interrelated that when one of said factors is inaccurate, the other factors are affected thereby, and sometimes a slight variation in one of said factors results in magnified inaccuracy in one or more of the other factors.

In its more detailed nature the invention resides in providing a novel wheel alignment testing apparatus embodying a pair of relatively movable, caliper like arms engageable at points on a wheel or wheel spindle at opposite sides of the vehicle and outside of the wheels, a movement indicating dial, a pointer mounted to move over the dial, and means for imparting movement of the arms to the pointer to indicate on the dial degrees of movement partaken of by the arms.

An object of the invention is to provide in an apparatus of the character stated a dial having calibrated zones thereon peculiar to particular types of testing, and means for adjustably mounting the dial so that any selected zone can be brought into cooperative relation to the pointer.

Another object of the invention is to provide in an apparatus of the character stated a frame structure for supporting the arms, dial and pointer, and means for supporting the frame for rolling movement back and forth with a vehicle the wheel alignment on which is being tested.

Another object of the invention is to provide in an apparatus of the character stated, novel means for connecting the arms and the pointer in driving relation and including individual drive rod connections with the respective arms, rack and pinion connections between the rods and the pointer, and novel means for mounting the arms for swinging movements toward and from each other, and also about the longitudinal centers of the rods.

Another object of the invention is to provide in an apparatus of the character stated novel means for providing arm point receiving recesses at the wheel spindle center or on the wheel outwardly of its center.

Another object of the invention is to provide in apparatus of the character stated individual swingable arms for engaging in test relationship outwardly of each wheel side, an individual rollable frame supporting each arm, and individual dial, pointer and drive connections with the respective arm on each frame.

Another object of the invention is to provide a novel method of testing wheel alignment by measuring the distance between the wheel spindle end center at one side of the vehicle and a definite point on the wheel at the opposite side at top, bottom, front or rear, and rolling said wheel 180° and measuring the then existing distance between said center and point and comparing it with the first obtained measurement to determine camber or toe-in accordingly as the point position change is effected by rolling movement from top to bottom or vice versa, or from front to rear or vice versa.

It is well known in the art that a wheel steerably moved around a slanting or castered king pin, or pivot point, will change in its vertical position while pivoting. Such vertical change would lengthen or shorten the distance between the top, or bottom, of the wheel and spindle center of the opposite wheel, thereby indicating the amount of caster present in the pivot pin for supporting the wheel that is being tested at a point in its circumference. It is, therefore, another object of the invention is to provide a novel method of testing wheel alignment by measuring the distance between the wheel spindle end center at one side of the vehicle and a definite point on the wheel at the opposite side at top or bottom with the vehicle wheels steerably turned a definite degree, then steerably turning the wheels in the other direction a like degree past their straightaway position and again measuring the distance between said center and said point and comparing it with the first obtained measurement to ascertain the amount of caster.

With the above and other objects in view that will hereinafter appear, the nature of the invention will be more fully understood by following the detailed description, the appended claims and the several views illustrated in the accompanying drawings.

In the drawings:

Figure 1 is a plan view illustrating one form of the invention, the front or steering wheels in a vehicle and their supporting axle being somewhat diagrammatically shown, the toe-in dial calibration zone being shown in operative position.

Figure 2 is a somewhat diagrammatic front elevation of the front wheels and supporting axle structure, parts being broken away and in section.

Figure 3 is an enlarged plan and part horizontal sectional view of the improved apparatus, the camber dial calibration zone being shown in operative position.

Figure 4 is an end elevation of the apparatus, a range in movement of the end arms being shown in dotted and dot and dash lines.

Figure 5 is an enlarged vertical cross section taken on the line 5—5 on Figure 1.

Figure 6 is a plan view illustrating another form of the apparatus in which a supporting rack or platform is included.

Figure 7 is a vertical cross section taken on the line 7—7 on Figure 6.

Figure 8 is a plan view illustrating another form of the apparatus in which is included a supporting rack or platform and individual tester units disposed to provide testing of the wheels at the respective sides of the vehicle.

Figure 9 is a plan view illustrating still another form of the apparatus in which is included a pair of pivotally connected, caliper like arms.

Figure 10 is a vertical cross section taken on the line 10—10 on Figure 9.

Figure 11 is a detail sectional view illustrating a removable bar or spider removably mountable on a wheel rim and having a center recess aligning the wheel spindle end recess and adapted to receive the pointed end of one of the tester arms.

Figure 12 is a detail sectional view illustrating a clamp attachable to a wheel rim edge portion and having a recess therein for receiving the pointed end of one of the tester arms.

In Figures 1 and 2 of the drawings I have illustrated, diagrammatically and in a more or less exaggerated fashion, a front wheel assembly and the relations of the camber, and toe-in arrangements of the wheels. The arrangements of and the necessity for camber, caster, and toe-in are well-known in the art and need not be described in detail herein. The interdependence of these arrangements likewise is well-known, and a testing device incapable of performing all of the necessary tests of these arrangements is of very limited value. In these figures the ground line is indicated at G, the axle at A, the king pin axes at K, the spindle axes at S, the wheels at W, the imaginary parallel vertical planes at X, the wheel's planes at Y, and the points at which the planes S and Y and the king pin axes K merge are indicated at Z. The desired relation of the spindle cranks C are maintained by the connecting radius rod R which is adjustably connected in the manner well-known in the art.

In the form of the invention illustrated in Figures 1 to 5 the apparatus includes a frame structure generally designated 5 and which is composed of long side walls 6, end walls 7, and top and bottom walls 8 and 9, said walls defining a chamber within the frame structure. A leg or pedestal 10 depends from each end of the frame structure and is equipped with a caster 11 at its lower end intended to rest and roll upon the ground, floor or other support upon which the apparatus is mounted.

An aperture 12 is provided in the top wall 8 of the frame structure and rotatably receives the sleeve body 13 depending from a dial plate 14. A retainer means 15 engages under the top wall 8 of the frame structure and prevents upward displacement of the dial, and a friction washer or other suitable friction means 16 is interposed between the undersurface of the dial and the top surface of the top wall 8 and serves to frictionally retain any position of adjustment of said dial. At its upper surface the dial is provided with several sets of testing calibrations. For example, a zone of calibrations 17 is provided for testing camber, the calibrations being graded progressively at each side of a zero mark 18. A generally similar zone of calibrations 19 is provided for facilitating the testing of caster, and a generally similar zone of calibrations 20 is provided for facilitating the testing of toe-in. It is to be understood that the dial may be adjusted to present any one of the calibrated zones in effective position in cooperative relation with a movable pointer which cooperates with the dial, and the friction means 16 serves to retain the dial in any position of adjustment.

A pointer shaft 22 extends upwardly through the top wall aperture 12 and through the dial sleeve 13 and has a pointer 24 secured to its upper end in position for swinging over the dial plate 14. The shaft 22 has a pinion 25 fixed thereon within the frame structure chamber, and this pinion is engaged at opposite sides by two racks 26, each said rack being attached to the inner end of thrust rod 27 which is slidably supported as at 28 in the frame structure.

Each rod 27 extends through the respective end wall 7 of the framing structure and is attached as at 29 to a tester arm 30. The point of attachment 29 is intermediate of the tester arm end and in position for dividing the arm into a long end and a short end extending in opposite directions from the connection 29. The long end of each arm is pointed and turned inwardly as at 31, and the short end of each arm is equipped with an anti-friction element, such as a ball 32 mounted in the socket 33 and disposed to engage and roll over a smooth surfaced arcuate boss 34 provided on the adjacent, opposing surface of the respective frame structure end wall 7.

It will be apparent by reference to Figures 3 and 4 of the drawings that the arms 30 can swing upwardly and downwardly about the center of the rods 27, or they can swing outwardly and inwardly about the balls 32 as fulcra, and in this latter case the outward or inward swinging of the arms will be attended by outward or inward movement of the rods 29 in the direction of their length.

The rods 27 have offset connection with the racks as at 35 so that the rods may lie in axial alignment one with the other. Retractile springs 36 connected to the racks and to the adjacent end walls 7, as at 37, in the frame structure constantly tend to draw the long ends of the tester arms 30 toward each other. It will be obvious that swinging movement of the arms 30 toward and from each other about the fulcra 32 will act through the rods 27 and racks 26 to impart rotation to the pinion 25 and swinging movement to the pointer 24. Any swinging of the arms 30 about the centers of the rods 27 in the manner indicated in dotted and dot and dash lines in Figure 4 will impart a negligible amount of rotational movement to the rods, an amount insufficient to in any wise disrupt the proper meshing relation between the racks 26 and the pinion 25.

In Figures 6 and 7 of the drawings I have disclosed another form of the apparatus in which the testing equipment is supported on and movable in a fore and aft direction along a platform or rack structure. In this form of the invention the platform or rack includes side rails 38 disposed in laterally spaced parallel relation, and these rails may be joined by suitable cross framing 39 if desired. The rails are supported above the ground or floor as at 40 and preferably include raised outer edges 41. The testing apparatus frame may be formed of side, end, top, and bottom walls as in the form of the invention illustrated in Figures 1 through 5 and is generally designated 42. Pedestals 43 depend from the respective ends of the frame 42 and are equipped at their lower extremities with pairs of rollers 44 disposed to ride on the rails 38 in the manner clearly illustrated in Figures 6 and 7.

A dial 45 is adjustably mounted on the top wall of the frame 42, preferably in the manner described in connection with Figures 1 through 5, and this dial also is provided with selective calibration zones 46 for cooperation with the pointer 47 to which movement is imparted by the rack and rod equipments 48, 49 in the manner previously described. The rods 49 are connected as at 50 at the ends thereof which extend through the end walls of the frame 42 to the tester arms 51. The long ends of the arms 51 are pointed and turned inwardly as at 52 as previously described, and the short ends of these arms are equipped with anti-friction fulcrums 53 which engage the adjacent end walls of the frame as previously described.

In Figure 8 of the drawings another form of the invention is illustrated in which means is provided for individually testing the wheels at the respective sides of the vehicle. In this illustration the platform or rack comprises side rails 54 and may include cross framing 55 if desired. Individual tester units are mounted on the respective rails 54, and since these units are identical in construction except for the fact that one is a right-hand unit and the other is a left-hand unit, only one such unit will be described in detail.

Each of the tester units employed in the form of the invention illustrated in Figure 8 includes a frame unit 56 which is supported on laterally spaced parallel supporting roller pairs 57 which engage opposite marginal edge portions of the respective rail 54. A dial 58 is adjustably mounted on the top wall of the frame 56, being adjustably mounted thereon in the manner disclosed in detail in connection with the form of the invention illustrated in Figures 1 through 5, and a pointer 59 is disposed to swing over the dial to indicate the test movements. The pointer is actuated by rack and pinion connections generally designated 16 through the thrust rod 61 which extends through the outer end wall of the frame and is connected in the manner hereinbefore described intermediately of the ends of the respective tester arm 62. The tester arm includes an inwardly turned point 63 at the extremity of its long arm, and is provided with an anti-friction ball fulcrum element 64 at its short end and disposed in position for engaging in rolling contact with the adjacent end wall of the frame 42.

In Figures 9 and 10 of the drawings still another form of the apparatus is illustrated. In this form of the invention caliper like arms 63 terminating at their free ends in inwardly turned points 66 are pivotally connected as at 67 on a frame standard 68 having an anti-friction ground or support engaging element 69 at its lower extremity. A pointer 70 is secured on and rotatable with the pivot pin 67, and a dial plate 71 is freely rotatable about said pin overlying one of the arms 65, the latter being free to swing about the pivot pin 67. The edge portion of the dial may be notched at 72 to receive a releasable detent 73 carried by the last mentioned arm 65, and by reason of the provision of this equipment the dial may be readily adjusted about its center and the adjustments thereof can be secured by the detent 73. It should be understood that the lowermost arm, as viewed in Figure 10, is secured to the pivot pin 67 so that the pivot pin and the pointer 70 turn therewith, the dial being mounted for movement with the other of said arms as previously stated. The arms 65 are connected by a retractile spring 74 which constantly urges the free ends of the arms toward each other.

In Figure 11 of the drawings there is illustrated a center bar or spider 75 which is dimensioned to span a wheel in the manner indicated, the extremities of the arm or arms being equipped with fingers disposed to snap over the rim edge and retain the element 75 in place with the recess 77 provided centrally thereof in alignment with the end center recess of the respective wheel spindle and intended to receive the point of one of the tester arms hereinbefore referred to.

In Figure 12 of the drawings there is illustrated a clamp element 78 which is removably mountable on a wheel rim edge and which is provided with a recess 79 for receiving the point of one of the tester arms hereinbefore described.

In all of the forms of the invention illustrated in Figures 1 through 10, the tester arms are so formed and arranged that they can be engaged with wheel or spindle portions at the outside, or in other words the tester arms are disposed so that they can straddle the whole front wheel assembly illustrated in Figures 1 and 2.

*Camber test*

In the making of a camber test with an apparatus constructed in the manner illustrated in Figures 1 through 5 or 6 and 7, the tester arms are brought into straddling relation with the front wheel assembly and the point on one tester arm is inserted in the spindle center 80 at that side of the vehicle, and the point of the other arm is engaged with the opposite wheel at a definite point 81 at the top thereof. This engagement may be directly with the tire or it may be in a rim edge mounted recess such as would be provided by use of an element of the nature disclosed in Figure 12. Similarly, the first mentioned arm point may be inserted in a bar or spider recess such as is illustrated in Figure 11 instead of directly in the spindle end recess if desired. With the parts in this position the dial 14 or 45 is adjusted to bring the zero mark in the camber test zone portion of the dial in registry with the pointer 24 or 47. The vehicle is now rolled forwardly until the pointer previously positioned at 81 reaches the bottom of the wheel as at 82. Any variation between the top position 81 and the bottom position 82 of the wheel will show up on the dial by the spacing of the pointer away from the zero mark and thus indicate the amount of camber. The operator may readily check the difference in positions indicated on the dial against the standard chart and determine if the amount of camber is normal and thereafter make such adjustments as are necessary to provide the proper amount of camber. In this camber test the unknown distance between point 80 and point 81 is set as zero on the dial in the manner stated. The wheel is rolled until the point 81 reaches the point 82. If the distance between point 80 and point 82 varies from the zero set at points 80 and 81, said variation represents the camber of the wheel roll. The advantages of this manner of testing the camber should be apparent to workers skilled in the art. While this camber test has been described as commencing with placement of the tester arm point at the top of the opposite wheel as at 81 followed by rolling of the wheel so as to bring the point down to the bottom of the wheel as at 82, it will be obvious that the test can be conducted by reversing this process.

Caster test

After the camber test, leave the gauge as it is and cut the wheels, as in steering, a known number of degrees. Now rotate the dial to zero registry with the pointer. Then cut the wheels the same number of degrees in the opposite direction beyond the center or straightaway position and the amount of caster present will show up on the dial by the spacing of the pointer from the zero mark. In the caster test, as stated, by leaving the arm point in engagement with the wheel at the bottom and cutting the wheels like distances in both directions, steering fashion, the dial and pointer being set at zero registry following the first wheel cutting operation, assuming that the king pin is off vertical, the amount of the off vertical or the caster condition will show up on the dial by the spacing of the pointer and the previously registered zero mark in the manner stated.

It will be apparent that in building an apparatus of the type herein disclosed it will be desirable to calibrate the scales in relation to the manufacturing method selected. For example in making arm 30 (Fig. 1) any desired length of arm could be used. Also, any leverage ratio between points 31, 29 and 32 could be selected; also, any gear ratio at 25 and 26 could be selected; also, any length pointer 24 could be selected. All these various ratios are subject to the builder's fancy, and they all would have control over how far pointer 24 would travel over dial 14.

In addition to this, when testing caster various angles of "steering cut" may be used by different operators. For example, some caster gauges are calibrated for a 20 degree "cut" to each side of straight ahead position. Others use 25 degrees, and still others use 30 degrees. Naturally these varying degrees of "steering cut" determine the final calibration which is to appear on the dial 14.

Inasmuch as there are three ratio points in the manufacture of the apparatus that are left to the discretion of builder, as well as an unlimited number of degrees of "steering cut" that could be selected by the builder, it is impractical to herein state specific limitations upon the calibrations to be placed on the dial 14.

However, it is possible to assume that a ratio of 4 to 1 is selected between the points 31 and pointer 24 (see Fig. 1); in other words if the arms 31 were spread apart $\frac{1}{16}$ of one inch the pointer 24 would move ¼ of one inch.

Now if the disclosed apparatus be thus hooked up and the wheel to be tested is "cut" 20 degrees in one direction, and the dial then rotated to read zero caster with arm point 31 at bottom center of the wheel being tested, the following procedure could follow. The operator then would "cut" the steering 30 degrees past center the opposite way and roll the car until point 31 was again at the bottom of wheel being tested; and if positive caster is present the point at the bottom of the wheel will stay stationary in relation to the floor or ground. However, the spindle center in the opposite wheel will lean away from the point (bottom of wheel being tested) when the steering is "cut" as in making a right turn; and will "lean toward" this point when the wheels are "cut" 30 degrees in making a left turn, and it is the "leaning away" and "leaning toward" the point at bottom of wheel being tested that causes the variation in the arm points to register on the dial due to the opposite moving "toward" and "away" from the test point.

In order to visualize this one need only recall that if positive caster is present when the wheels are cut to the left the car "leans" to the left and vice versa. While this "leaning" takes place the bottom of the wheels do not move on the ground. The movement of the car takes place due to the spindle revolving part way around the slanted king pin. It also must be remembered that while one spindle end scribed downward from horizontal the opposite one scribes upward thereby causing the car to lean right or left in relation to the turn being made.

It therefore follows that with the apparatus parts proportioned and tested by steering cuts as described, the pointer 24 would travel over dial 14 a total of ¼ of one inch or 1 degree if the wheel being tested had 1 degree of caster present. Simple observation of the properly calibrated caster scale portion will reveal the amount of caster present.

Toe-in-test

With the vehicle resting on the floor or on the rack rails, the testing apparatus is placed so that the spread arms will straddle the front wheel assembly. Each arm point is set against the wheel at the front center as at 83 in Figure 4, and with the arms in this position the dial is adjusted to present the toe-in testing zone in cooperative relation with the pointer and for registering the pointer with the zero mark on said zone portion. The vehicle is now rolled forwardly and the tester arms will move down and around the lower half of the wheels and back up to the rear central part indicated at 84 in Figure 4. This relative movement of the parts will bring about movement of the pointer to indicate any variation between the distances across the wheels at points 83—83 and 84—84. The amount of the spacing of the pointer from the zero mark will indicate the amount of toe-in.

It will be obvious that in the forms of the invention illustrated in Figures 1 through 7 the testing apparatus may move freely with the vehicle on its anti-friction supports during the making of any of the tests hereinbefore described.

In the form of the invention illustrated in Figure 8 the wheels at the opposite sides of the vehicle may be individually tested by placing the points of the tester arms against the wheels in the manner hereinbefore described and rolling the wheels to cause the pointer and dial equipments to indicate the amount of camber, caster, or toe-in in the manner hereinbefore described, the only difference in the operation in this form of the apparatus being that in this form the engagement of the tester arms in the wheel spindle end centers is not utilized. The individual tester frames move back and forth over the individual supporting rails properly guided and confined in movement by the pairs of supporting rollers.

Any of the tests hereinbefore described can be performed in the same manner previously described by the apparatus illustrated in Figures 9 and 10, the single antifriction support 69 of the frame permitting the apparatus to move with the vehicle and partake of any tilting movement which is necessary because of the particular mounting and assembly relation of the caliper like arms 65. As previously stated, the pointer moves with one of the arms 65 and the dial is adjustably connected with and moves with the other of the arms 65.

Due to the fact that in the making of the respective camber, caster, and toe-in tests the pointers will move various and different distances, the dial zones hereinbefore referred to are distinctively calibrated. It should be understood that one degree of camber would cover about one-eighth inch of dial surface, whereas one degree of caster would cover about one-fourth inch of dial surface.

The advantages of the method of testing wheel alignment hereinbefore described and from the use of the particular forms of apparatus disclosed herein are many and will be readily appreciated by workers in the art. It will be obvious that the apparatus is built on a principle which eliminates any square angles or set angles such as are usually provided in testing devices designed for the purposes herein mentioned. By employment of the apparatus herein disclosed the angles of wheel alignment are tested by comparative readings and all chances of obtaining improper readings because of bent wheels, bent gauge parts or unlevel floors or other supporting surfaces, uneven or worn tire surfaces, or under inflated tires, are eliminated. The tests are accomplished by arm engagement outside the wheels and all necessity of crawling under the car to attach the gauge and the necessity of assuming awkward positions in manipulating or reading the gauge are eliminated.

The importance of the feature of engaging one of the tester arms with the spindle end center or its equivalent cannot be exaggerated because by this means the test is made with relation to the position of the spindle, and it is well-known that the wheel goes in the direction in which the spindle is positioned, not in the direction in which the wheel points. In other words, according to the method herein disclosed the spindle camber position is not read in relation to gravity, but in relation to its opposite support center. Likewise, the spindle position is not read in relation to a "square". This in important due to the fact that a "square" may be sprung "out of square" and misread.

It is also important that according to the method herein disclosed the testing apparatus is not moved from front to rear or from top to bottom of the wheels manually. This is important because where manual placement of the testing device is necessary mistakes occur due to upsetting of the reading while changes in position are being made.

*Steering geometry test*

Steering geometry tests also may be made with the herein disclosed apparatus. Steering geometry, sometimes called "toe-out on turns," refers to the changing relation of the two front wheels when the steering is "cut" to make a turn. For this purpose the dial plates of Figures 1, 6 and 9, for example, may be equipped with an additional zone of calibrations 85 graded progressively at each side of a zero mark for facilitating the testing of steering geometry. In making this test, the arms 30, 51 or 65, as the case may be, are placed against the front wheels in the manner illustrated in Figures 1, 6 and 9, the wheels being placed straight front. The dial is then adjusted to align the zero mark of the steering geometry zone calibrations with the pointer 24, 47 or 70. The wheels are then "cut," as in steering, like distances from side to side, and any variation in the relation of the wheel positions will be indicated on the respective dial by the arms spreading and moving the pointer over said dial.

While references are herein made to rolling or turning the wheels 180° from top to bottom or from front to rear or vice versa to place the tester arm end extremities at diametrically opposite points on the wheels, as in the case of the camber or toe-in tests, these are not to be construed as limiting the invention to this definite degree of movement, because the invention definitely is not so limited. For example, in testing camber, the 180° roll of the wheel or wheels imparts indicator movement double the amount of the camber, this being offset on the dial marking. Therefore, it is possible to test camber with only 90° of wheel roll. This is true also of the caster test. In other words, a camber test can be made by moving the wheel a selected definite distance of 180° or less from top toward bottom or vice versa, and a caster test can be made by moving the wheel a selected definite distance fore and aft with respect to the wheel center, not necessarily as much as 90° in each direction.

It is of course to be understood that the details of structure and the arrangement of parts may be variously changed and modified without departing from the spirit and scope of the invention.

I claim:

1. In apparatus of the character described, a frame disposable transversely of and in front of a vehicle front wheel assembly, a pair of arms pivotally mounted on said frame for swinging movement toward or from each other and equipped at free end portions thereof with inwardly directed points spaced far enough apart to straddle and engage at outside points with the wheels at opposite sides of the assembly, means constantly tending to move the arms toward each other, means movably supporting the frame to move with the assembly as it is moved backwardly or forwardly, a single dial on the frame, a single pointer movable over the dial, and means for imparting movement from both said arms to said single pointer to indicate wheel alignment.

2. In apparatus of the character described, a frame disposable transversely of and in front of a vehicle front wheel assembly, a pair of arms pivotally mounted on said frame for swinging movement toward or from each other and equipped at free end portions thereof with inwardly directed points spaced far enough apart to straddle and engage at outside points with the wheels at opposite sides of the assembly, means constantly tending to move the arms toward each other, a single dial on the frame, a single pointer movable over the dial, and means for imparting movement from both said arms to said single pointer to indicate wheel alignment.

3. In apparatus of the character described, a frame disposable transversely of and in front of a vehicle front wheel assembly, a pair of arms pivotally mounted on said frame for swinging movement toward or from each other and equipped at free end portions thereof with inwardly directed points spaced far enough apart to straddle and engage at outside points with the wheels at opposite sides of the assembly, means constantly tending to move the arms toward each other, a dial on the frame, a pointer movable over the dial, and means for imparting movement from the arms to the pointer to indicate wheel alignment, said dial having a plurality of calibrated zones thereon selectively placeable in associated relation to the pointer and each designed to indicate a particular type of test result such as camber, caster or toe-in.

4. In apparatus of the character described, a frame disposable transversely of and in front of a vehicle front wheel assembly, a pair of arms pivotally mounted on said frame for swinging movement toward or from each other and equipped at free end portions thereof with inwardly directed points spaced far enough apart to straddle and engage at outside points with the wheels at opposite sides of the assembly, means constantly tending to move the arms toward each other, means movably supporting the frame to move with the assembly as it is moved backwardly or forwardly, a dial on the frame, a pointer movable over the dial, means for imparting movement from the arms to the pointer to indicate wheel alignment, and means supporting said arms for independent swinging movement about generally horizontal axes so that both arms can follow around with wheels partaking of rolling movement or one arm can follow rolling movement or steering movement of one wheel while the other arm can remain with its point engaged in the spindle end center associated with the other wheel.

5. In apparatus of the character described, a frame disposable transversely of and in front of a vehicle front wheel assembly, a pair of arms pivotally mounted on said frame for swinging movement toward or from each other and equipped at free end portions thereof with inwardly directed points spaced far enough apart to straddle and engage at outside points with the wheels at opposite sides of the assembly, means constantly tending to move the arms toward each other, means movably supporting the frame to move with the assembly as it is moved backwardly or forwardly, a dial on the frame, a pointer movable over the dial, means for imparting movement from the arms to the pointer to indicate wheel alignment, and means supporting said arms for independent swinging movement about generally horizontal axes so that both arms can follow around with wheels partaking of rolling movement or one arm can follow rolling movement of steering movement of one wheel while the other arm can remain with its point engaged in the spindle end center associated with the other wheel, said dial having a plurality of calibrated zones thereon selectively placeable in associated relation to the pointer and each designed to indicate a particular type of test result such as camber, caster or toe-in.

6. In apparatus of the character described, a frame disposable transversely of and in front of a vehicle front wheel assembly, a pair of arms pivotally mounted on said frame for swinging movement toward or from each other and equipped at free end portions thereof with inwardly directed points spaced far enough apart to straddle and engage at outside points with the wheels at opposite sides of the assembly, means constantly tending to move the arms toward each other, a pair of supporting rails to rollably support the wheels of said front assembly, means rollably supporting the frame on said rails to move with the front assembly as it is moved backwardly or forwardly over said rails, a dial on the frame, a pointer movable over the dial, and means for imparting movement from the arms to the pointer to indicate wheel alignment.

7. A wheel alignment testing apparatus comprising a transverse frame, means rollably supporting the frame, an arm disposed longitudinally at each end of the frame, means fulcruming each arm and mounting the arms for swinging movement toward or from each other, means constantly tending to move the arms together, each said arm having an inwardly directed point at a free end portion thereof, a dial supported on the frame and having test result indicating calibrations thereon, a pointer movable over the dial, and means connecting the arms to the pointer to impart arm movement thereto.

8. A wheel alignment testing apparatus comprising a transverse frame, means rollably supporting the frame, an arm disposed longitudinally at each end of the frame, means fulcruming each arm and mounting the arms for swinging movement toward or from each other, means constantly tending to move the arms together, each said arm having an inwardly directed point at a free end portion thereof, a dial supported on the frame and having test result indicating calibrations thereon, a pointer movable over the dial, and means connecting the arms to the pointer to impart arm movement thereto, said last named means including a pinion connected to the pointer, a rack engageable at each fore and aft side of the pinion, and two thrust rods, one said rod being connected to each rack and to one of said arms.

9. A wheel alignment testing apparatus comprising a transverse frame, means rollably supporting the frame, an arm disposed longitudinally at each end of the frame, means fulcruming each arm and mounting the arms for swinging movement toward or from each other, means constantly tending to move the arms together, each said arm having an inwardly directed point at a free end portion thereof, a dial supported on the frame and having test result indicating calibrations thereon, a pointer movable over the dial, and means connecting the arms to the pointer to impart arm movement thereto, said last named means including a pinion connected to the pointer, a rack engageable at each fore and aft side of the pinion, and two thrust rods, one said rod being connected to each rack and to one of said arms, said rods having offset connection with said racks and being disposed in axial alignment, and said arms being also swingable upwardly and downwardly about the axes of said rods.

10. A wheel alignment testing apparatus comprising a transverse frame, means rollably supporting the frame, an arm disposed longitudinally at each end of the frame, means fulcruming each arm and mounting the arms for swinging movement toward or from each other, means constantly tending to move the arms together, each said arm having an inwardly directed point at a free end portion thereof, a dial frictionally supported on said frame for movement of adjustment about its center and having thereon a plurality of calibrated test result indicating zones each designed to indicate a particular type of test result such as camber, caster or toe-in, a pointer movable over the dial, and means connecting the arms to the pointer to impart arm movement thereto.

11. A wheel alignment testing apparatus comprising a transverse frame, means rollably supporting the frame, an arm disposed longitudinally at each end of the frame, means fulcruming each arm and mounting the arms for swinging movement toward or from each other, means constantly tending to move the arms together, each said arm having an inwardly directed point at a free end portion thereof, a dial supported on the frame and having test result indicating calibrations thereon, a pointer movable over the dial, and means connecting the arms to the pointer to impart arm movement thereto, said last named means including a pinion connected to the pointer, a rack engageable at each fore and aft side of the pinion, and two thrust rods, one said rod being connected to each rack and to one of said arms, said fulcruming means constituting an anti-friction element in mutual engagement between each arm and the adjacent portion of the frame and spaced a distance from the respective arm connected rod, and said arms being also swingable upwardly and downwardly about the axes of the rods.

12. In apparatus of the character described, a wheel alignment testing unit comprising a transverse frame, means rollably supporting the frame, a dial supported on the frame and having test result indicating calibrations thereon, a pointer movable over the dial, a longitudinally disposed arm pivotally mounted on the frame and having a wheel side engaging point at a free end portion thereof, means pivotally supporting the arm on the frame, means constantly urging the arm in a wheel engaging direction, and means for imparting movement of the arm to the pointer.

13. In apparatus of the character described, a wheel alignment testing unit comprising a transverse frame, means rollably supporting the frame, a dial supported on the frame and having test result indicating calibrations thereon, a pointer movable over the dial, a longitudinally disposed arm pivotally mounted on the frame and having a wheel side engaging point at a free end portion thereof, means pivotally supporting the arm on the frame, means constantly urging the arm in a wheel engaging direction, and means for imparting movement of the arm to the pointer, said last named means including a pinion connected to the pointer, a rod connected to the arm and having a rack portion engaging said pinion, said arm being swingable upwardly and downwardly about the center of said rod, and said pivotal arm mounting comprising a fulcrum contact between the arm and an adjacent portion of the frame at a point spaced from said rod connection with the arm.

14. In apparatus of the character described, a wheel alignment testing unit comprising a transverse frame, means rollably supporting the frame, a dial supported on the frame and having test result indicating calibrations thereon, a pointer movable over the dial, a longitudinally disposed arm pivotally mounted on the frame and having a wheel side engaging point at a free end portion thereof, means pivotally supporting the arm on the frame, means constantly urging the arm in a wheel engaging direction, and means for imparting movement of the arm to the pointer, said last named means including a pinion connected to the pointer, a rod connected to the arm and having a rack portion engaging said pinion, said arm being swingable upwardly and downwardly about the center of said rod, and said pivotal arm mounting comprising a fulcrum contact between the arm and an adjacent portion of the frame at a point spaced from said rod connection with the arm, and said fulcrum contact constituting an anti-friction element mutually engaging opposed arm and frame portions.

15. A wheel alignment testing apparatus comprising a pair of caliper-like arms pivotally connected at one end and having inwardly directed wheel engaging points at their free ends, a frame movably supporting the arms at their pivotal connection, a dial movable with one arm and having test result indicating calibrations thereon, and a pointer mounted for movement with the other of said arms over said dial.

16. A wheel alignment testing apparatus comprising a pair of caliper-like arms pivotally connected at one end and having inwardly directed wheel engaging points at their free ends, a frame movably supporting the arms at their pivotal connection, a dial movable with one arm and having test result indicating calibrations thereon, and a pointer mounted for movement with the other of said arms over said dial, said dial being rotatably adjustable on the arm with which it moves and including a plurality of calibrated zones selectively placeable in associated relation to the pointer and each designed to indicate a particular type of test result such as camber, caster or toe-in.

17. The herein described method of testing camber which consists in measuring the distance between the wheel spindle end center at one side of a vehicle front wheel assembly and a definite point centered above the center of and on the wheel at the opposite side of said assembly, rolling the assembly to move said definite point 180° and place it centrally below the wheel center, and measuring the then existing distance between said end center and definite point and comparing it with the first obtained measurement to determine the camber of said wheel.

18. The herein described method of testing toe-in which consists in measuring the distance between the wheel spindle end center at one side of a vehicle front wheel assembly and a definite point radially outward from the center of and on the wheel at the opposite side of the assembly and in substantially horizontal alignment with said wheel center, rolling the assembly to move said definite point 180° and place it at the diametrically opposite side from its original position, and measuring the then existing distance between said end center and definite point and comparing it with the first obtained measurement to determine the toe-in of said wheel.

19. The herein described method of testing caster which consists in measuring the distance between the wheel spindle end center at one side of a vehicle front wheel assembly and a definite point in a vertical plane passing through the axis of and on the wheel at the opposite side of said assembly with the wheels of the assembly steerably turned a definite degree, steerably turning the wheels a like definite degree in the opposite direction past their normal straightaway position, and measuring the then existing distance between said center and said point and comparing it with the first obtained measurement to ascertain the amount of caster.

20. In apparatus of the character described, a frame disposable transversely of and in front of a vehicle front wheel assembly, a pair of arms pivotally mounted on said frame for swinging movement toward or from each other and equipped at free end portions thereof with inwardly directed points spaced far enough apart to straddle and engage at outside points with the wheels at opposite sides of the assembly, means constantly tending to move the arms toward each other, means movably supporting the frame to move with the assembly as it is moved backwardly or forwardly, a single dial element on the frame, a pointer element movable over the dial, and means for causing one said element to move relative to the other of said elements responsive to relative movement between said arms for indicating wheel alignment.

21. The herein described method of testing camber which consists in measuring the distance between the wheel spindle end center at one side of a vehicle front wheel assembly and a definite point centered above the center of and on the wheel at the opposite side of said assembly, rolling the assembly to move said definite point to another point in the circumference of the wheel being tested, and measuring the then existing distance between said end center and definite point and comparing it with the first obtained measurement to determine the camber of said wheel.

22. The herein described method of testing toe-in which consists in measuring the distance between the wheel spindle end center at one side of a vehicle front wheel assembly and a definite point radially outward from the center of and on the wheel at the opposite side of the assembly and in substantially horizontal alignment with said wheel center, rolling the assembly to move said definite point to another point in the circumference of the wheel being tested, and measuring the then existing distance between said end center and definite point and comparing it with the first obtained measurement to determine the toe-in of said wheel.

23. The herein described method of testing caster which consists in measuring the distance between the wheel spindle end center at one side of a vehicle front wheel assembly and a selected point in a vertical plane of and on the wheel at the opposite side of said assembly with the wheels of the assembly steerably turned a selected degree, steerably turning the wheels a like degree in the opposite direction past their normal straightaway position, and measuring the then existing distance between said center and said point and comparing it with the first obtained measurement to ascertain the amount of caster.

EDWARD DAVID WILKERSON.